March 10, 1936.  W. H. EMERSON  2,033,695
CONVEYER MECHANISM
Filed May 21, 1934  2 Sheets-Sheet 1
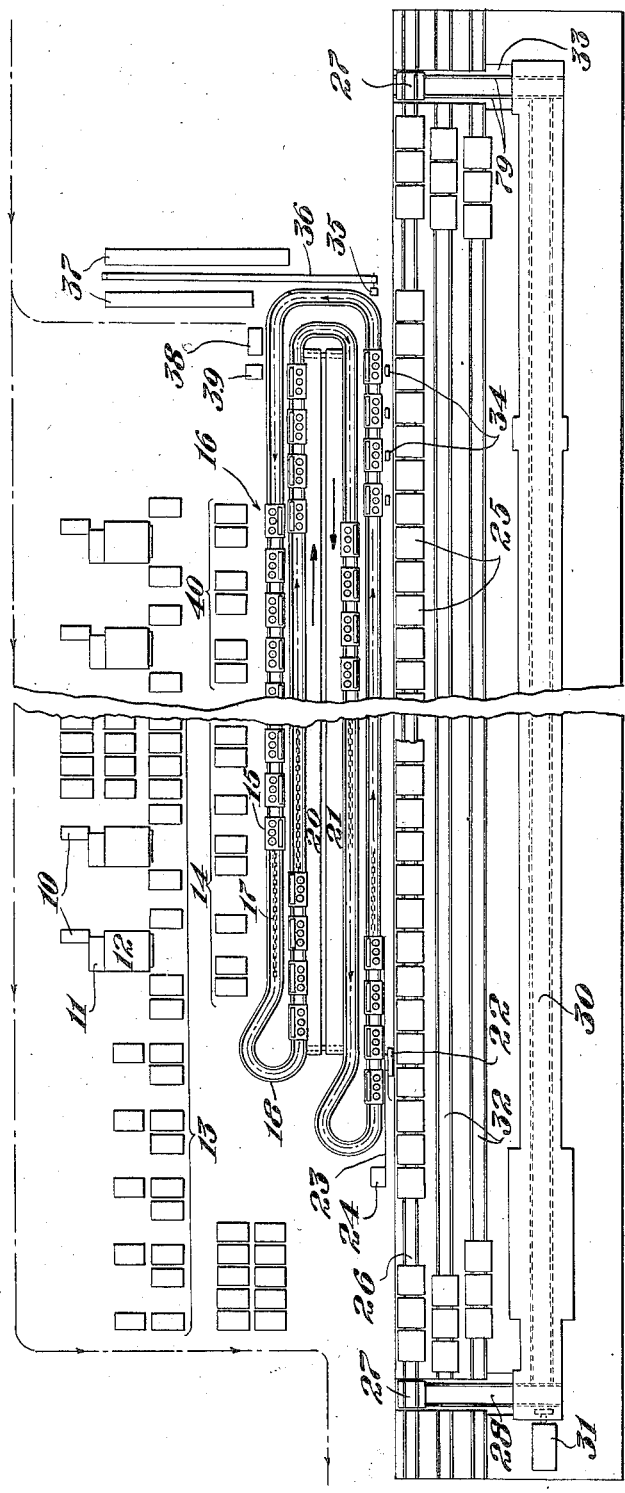
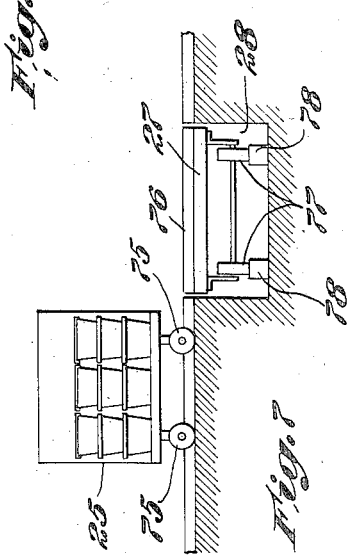
Inventor
Walter Howard Emerson
by Roberts, Cushman & Woodbury
Att'ys.

March 10, 1936.　　　W. H. EMERSON　　　2,033,695
CONVEYER MECHANISM
Filed May 21, 1934　　　2 Sheets-Sheet 2
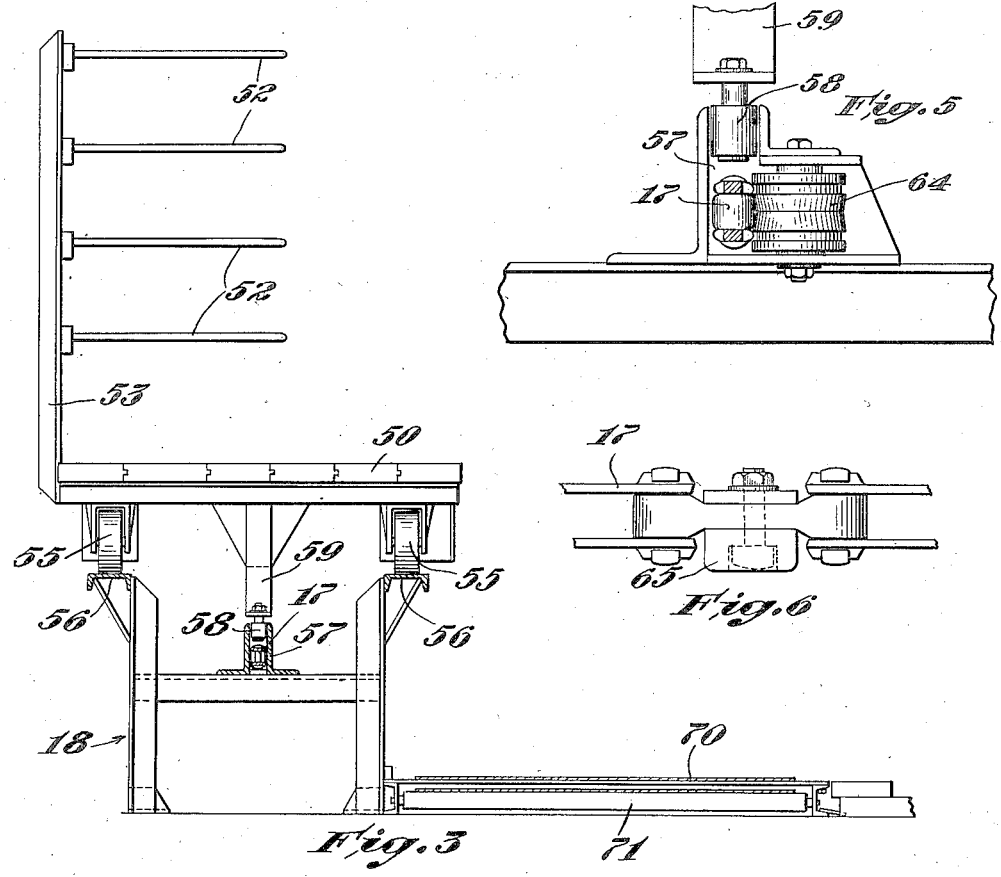
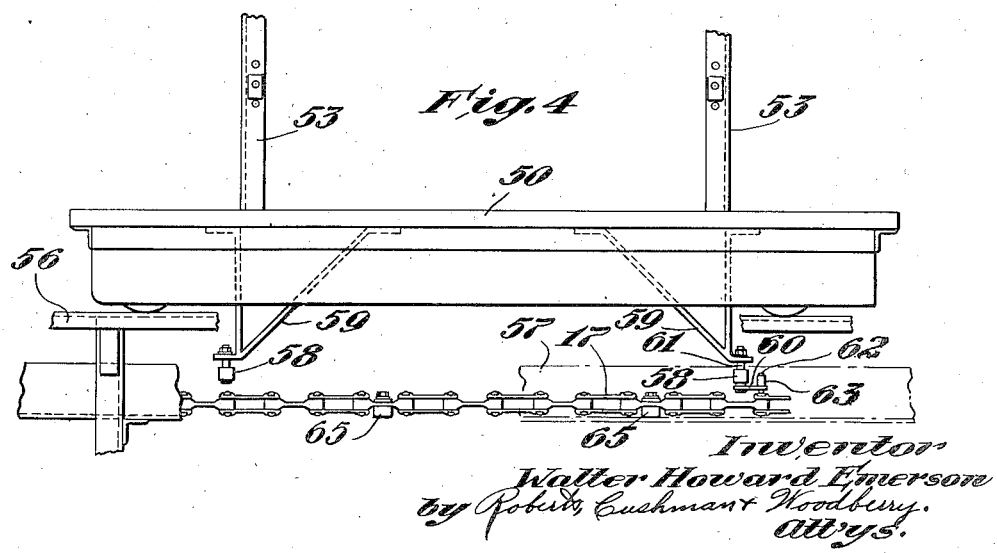
Inventor
Walter Howard Emerson
by Roberts, Cushman & Woodbury.
Attys.

Patented Mar. 10, 1936

2,033,695

UNITED STATES PATENT OFFICE 2,033,695

CONVEYER MECHANISM

Walter Howard Emerson, East Liverpool, Ohio, assignor to The Lamson Company, Syracuse, N. Y., a corporation of Massachusetts Application May 21, 1934, Serial No. 726,672

5 Claims. (Cl. 198—19)

This invention relates to an improvement in conveyer mechanism and has for its primary object the provision of mechanism for transporting simultaneously the work operated upon and the operator whereby the work is operated upon while in transit.

A further object of this invention resides in the provision of a U-shaped work conveyer and two operator conveyors traveling in opposite direction within the loop of the work conveyer whereby the operations can be carried on while the work travels through the loop, the operator crossing from the conveyer on which he was traveling when the operation started to the other conveyer on which he travels as he completes the operation and the second conveyer bringing the operator back to a point adjacent the starting position.

Another object of this invention resides in the provision of a work conveyer in the shape of a U the walls of which are formed by two conveyer lanes moving in opposite directions whereby the work is fed to the conveyer as the conveyer travels along an outer lane, is operated upon as the conveyer travels along the inner lane and the completed work is removed from the conveyer as it travels along an outer lane.

Still another object of this invention resides in the provision of a conveyer comprising a plurality of cars and a chain to which said cars are secured, said chain traveling in a channel in which ride rollers carried by the cars and rails parallel to and on either side of the channel on which the cars rest.

Other objects will appear from the following description of one embodiment of this invention as used in the manufacture of china or pottery and from the accompanying drawings which illustrate such embodiment and in which:

Fig. 1 is a layout of a plant in which bisque ware is manufactured and in which one embodiment of this invention is employed;

Fig. 2 is a perspective view illustrating an operator working at one of the cars of the work conveyer;

Fig. 3 is an end elevation of a car and a cross section of the supporting track and an operator carrying belt;

Fig. 4 is a front elevation of such car a portion of the track being omitted;

Fig. 5 is a detail view illustrating the manner in which the car is guided around the turns;

Fig. 6 is an elevation of a portion of the conveyer chain; and

Fig. 7 is a detail view illustrating a kiln car and a transfer platform.

The embodiment of this invention illustrated in the drawings and described specifically hereinbelow is employed in the manufacture of bisque china or pottery ware. One treatment of such ware comprises a series of steps or operations which will be briefly described with reference to the layout shown in Fig. 1.

The clay from which the ware is made is first battered out and flattened to the desired thickness at the table 10, shaped to the proper style by a jigger-man and placed on an elevator 11 by which it is carried through a drying furnace 12. The dried green ware on leaving the furnace is inspected and if passed is placed on one of the station racks 13. From the station racks the ware is placed on ware boards in the storage racks 14 where it remains for a day or more until thoroughly seasoned. The loaded ware boards are thereafter placed on cars 15 which form a part of a conveyer mechanism 16 being attached to an endless chain 17 and moved thereby, in the direction indicated by arrows, along a track 18.

The cars 15, commonly designated in this industry as ware stations, include racks which receive the ware boards and tables previously provided with a plurality of saggers, three being indicated in the drawings.

The track 18 is looped in the shape of a letter U, the walls of which are formed by double lanes. The cars are loaded along one outer wall of the loop and are moved to the inner wall thereof. As the cars travel along the inner wall of the loop operators remove the ware from the boards and place it in the saggers 51 (see Fig. 2). The operators stand on suitable conveying means such as endless belts 20 and 21 which move in opposite directions within the loop. By the time the cars reach the end of the loop all the ware has been placed in the saggers. The filled saggers are placed one at a time upon a table 22 movable along a track 23 and wads of clay taken from the station 24 are laid along the upper rims thereof. It is well known in this industry that the wads level up and seal the saggers as they are piled one on top of another upon the kiln cars 25.

The kiln cars 25 are pushed along the track 26 until delivered separately upon a transfer platform 27. The platform 27 travels in a depressed channel 28 at right angles to the track 26 and presents the kiln car in front of the kiln 30 into which it is advanced by a hydraulic ram 31. The kiln cars 25 are loaded much faster than they can be advanced through the kiln 30 and hence storage tracks 32 parallel to the track 26 are provided to which the kiln cars may be delivered by the platform 27. The kiln cars on leaving the kiln 30, which is of such length that the ware has been properly fired, are received by a second transfer platform 27 traveling in a channel 33 and delivered to one of the tracks 26, 32. The saggers are transferred from the kiln cars 25 to the cars 15 at the positions designated as 34 and carried to an operator at 35 who removes the fired ware from the saggers and places it on a conveyer belt 36 by which it is transported to storage racks 37. The saggers are cleaned and inspected at station 38, any broken ones being replaced, and then filled with sand to the proper level at 39. The ware boards are removed from the cars 15 and placed in the empty storage racks standing in the group at 40.

The car 15 comprises a table 50 on which the saggers 51 rest and a plurality of racks consisting of pairs of bars 52 carried by uprights 53, which receive the loaded ware boards 54. As shown on Fig. 2 the saggers and ware are so supported in the car that they are easily accessible to the operator. Rollers 55 rest upon the rails 56 of the track 18. The chain 17 travels in a continuous channel 57 which also receives rollers 58 supported upon brackets 59 fixed to the underside of the table 50. The car is connected at one end to the chain by an arm 60 pivotally connected at one end to a pin 61 which carries a roller 58 and attached at the other end to an extended link pin 62 of the chain through a sleeve 63 which fits loosely on the link pin. The walls of the channel 57 are interrupted at the turns of the track and rollers 64 are provided to guide the chain at those points (see Fig. 5). Secured at intervals to the chain 17 are shoes 65 which ride on the base of the channel 57 and reduce the frictional resistance to the travel of the chain. The chain 17 is driven by any suitable driving means (not shown).

The conveyer belts 20 and 21 on which the operators stand may be of any well known construction, the upper run riding on a supporting platform 70 and the lower run riding on idler rollers 71 (see Fig. 3). Suitable means (not shown) is provided for driving the belts in the directions designated by the arrows in Fig. 1.

Each kiln car 25 is provided with flanged wheels 75 which ride on the tracks 26 or 32. The transfer platforms 27 are provided with tracks 76 which are of the same gauge as the tracks 26 and 32 and when in register therewith receive the wheels 75. The wheels 77 of the platforms ride upon tracks 78 and 79 in the channels 28 and 33.

From the above description it will be noted that as the cars 15 travel along the inner lane of the loop the operators standing on the belts 20 or 21 transfer the ware from the ware boards on the racks to the saggers. The car conveyer 16 and the operator conveyers 20 and 21 travel at the same speed which is preferably about twenty feet per minute. An operator can usually take care of a group of five cars during their travel through the loop. He starts on the first car of the group while standing on the belt 20 and, by stepping across to the belt 21, he should be able to finish the group before the last car leaves the loop. The recirculation of the cars pointed out above however will return to the loop any which the operator was unable for some reason to take care of so that the work can be finished on a later travel of the cars through the loop.

The handling in the manufacture of glost ware is substantially the same as that described above and similar mechanism is employed. While the treatment of china and pottery ware has been set forth at some length it was for the purpose of illustration only and conveyer mechanism embodying this invention is applicable for use in many industries, the broad feature of this invention being the transportation of work carrying elements in combination with conveying means for the operators whereby the operations are easily performed while the work is in transit.

While one embodiment only of this invention has been shown and described it will be understood that I am not limited thereto since other embodiments may be made without departing from the spirit and scope of the invention as set forth in the following claims.

I claim:

1. Conveyer mechanism comprising a conveyer including a plurality of work carrying cars, said conveyer being looped in the form of a letter U, and two conveyers within the loop on which operators upon the work are transported adjacent the cars on the first conveyer, said second conveyers moving in opposite directions each in the direction in which the adjacent portion of the first conveyer travels whereby the operations upon the work on the cars are completed while the cars are in motion through the loop.

2. Conveyer mechanism comprising a conveyer including a plurality of work carrying cars, said conveyer being looped in the form of a letter U, the parallel walls of which travel in opposite directions, and two conveyers within and parallel to the walls of the loop on which operators upon the work are transported adjacent the cars on the first conveyer, said second conveyers traveling in opposite directions each in the direction in which the wall of the loop adjacent thereto travels whereby the operators upon the work on the cars are completed while the cars are in motion through the loop.

3. Conveyer mechanism comprising an endless conveyer including a plurality of work carrying cars, said conveyer being looped in the form of a letter U having inner and outer lanes, and a conveyer within the loop for operators upon the work on the cars whereby work, furnished to the cars as they travel along an outer lane, is operated upon as they travel along an inner lane, and the finished work is removed from the cars as they travel along an outer lane.

4. Conveyer mechanism comprising an endless conveyer including a plurality of work carrying cars, said conveyer being looped in the form of a letter U having inner and outer lanes, whereby work, furnished to the cars as they travel along an outer lane, is operated upon as they travel along an inner lane, and the finished work is removed from the cars as they travel along an outer lane.

5. Conveyer mechanism comprising an endless conveyer including a plurality of work carrying cars, said conveyer being looped in the form of a letter U having inner and outer lanes, and two conveyers within the loop for operators upon the work on the cars, such conveyers moving in opposite directions, each in the direction of the adjacent inner lane of the first conveyer whereby work, furnished to the cars as they travel along an outer lane, is operated upon as they travel along the inner lanes and the finished work is removed from the cars as they travel along an outer lane.

WALTER HOWARD EMERSON.